Figure 1:
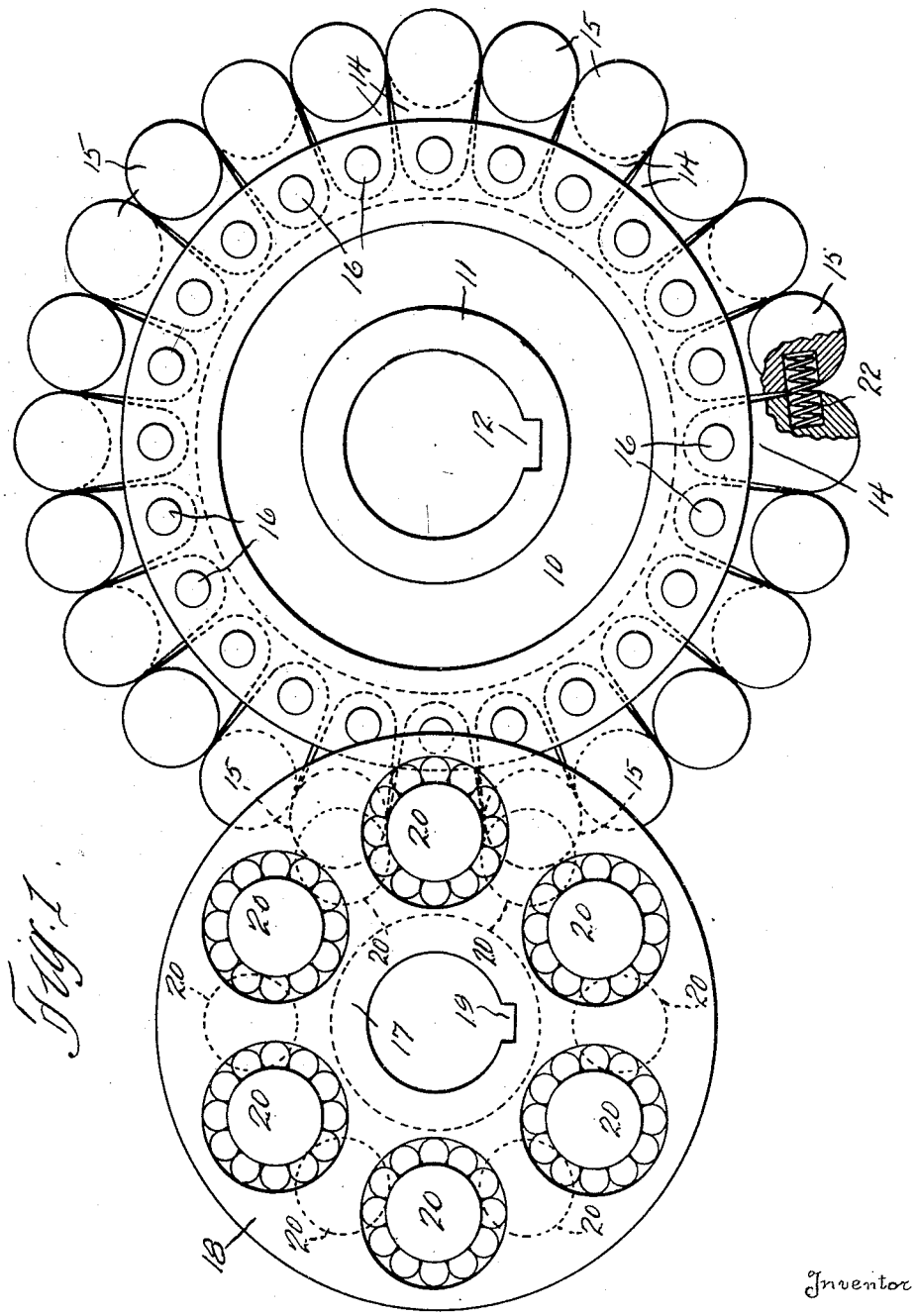

Aug. 4, 1931.  A. RUETSCHI  1,817,019
GEARING
Filed May 15, 1930   2 Sheets-Sheet 1

Inventor
Arnold Ruetschi
By Hull Brock + West
Attorney

Aug. 4, 1931.  A. RUETSCHI  1,817,019
GEARING
Filed May 15, 1930  2 Sheets-Sheet 2
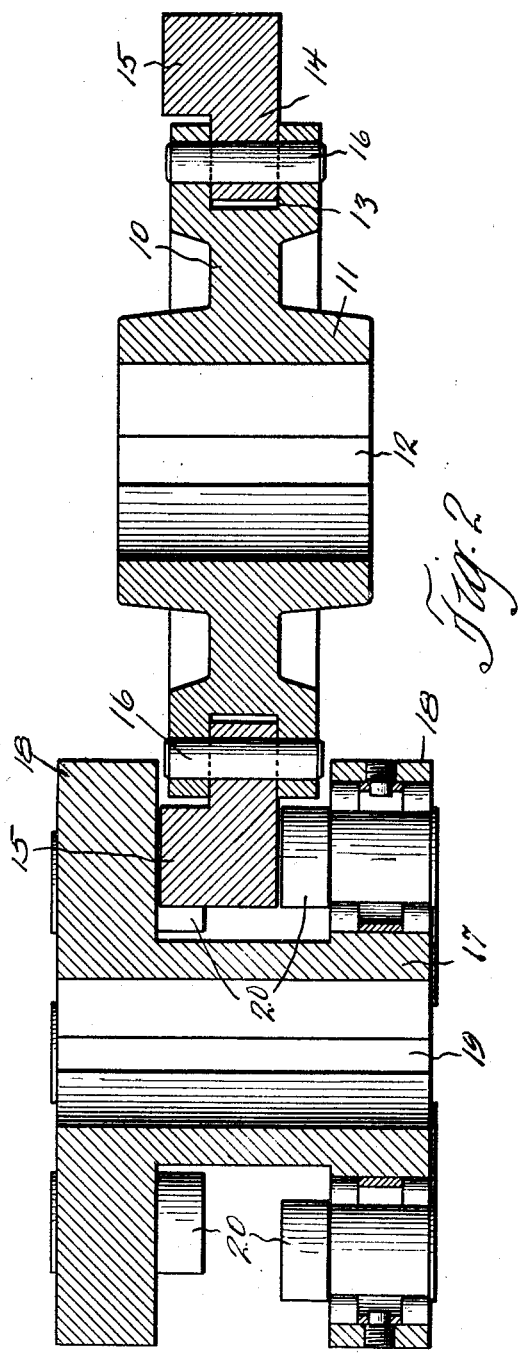
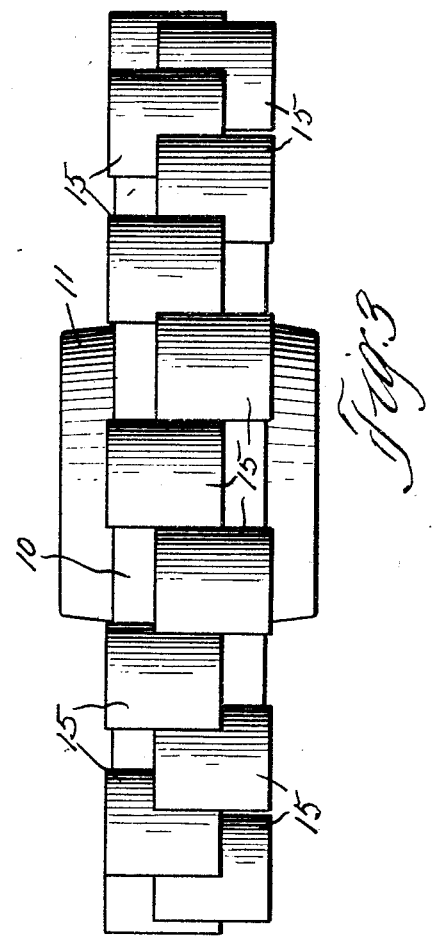
Inventor
Arnold Ruetschi
By Hull Brock + West
Attorney Patented Aug. 4, 1931

1,817,019

UNITED STATES PATENT OFFICE

ARNOLD RUETSCHI, OF LAKEWOOD, OHIO

GEARING

Application filed May 15, 1930. Serial No. 452,770.

This invention relates to a gearing assembly and has for its object to provide a gear and pinion adapted to mesh therewith which will provide a degree of flexibility and overcome friction while attaining comparative simplicity and manufacturing economy.

With these and other objects in view, the invention consists in details of construction and arrangement of parts as hereinafter described and claimed.

Fig. 1 is a side view showing the gear and pinion in mesh; Fig. 2 is a plan view of the assembly of Fig. 1 and Fig. 3 is a plan view of the gear alone.

The gear comprises a central disk 10 provided with a hub portion 11 which is centrally drilled to receive a shaft and provided with a keyway 12 for keying such shaft thereto. The periphery of the central disk 10 is bifurcated to provide a groove 13 for the reception of tooth members 14, which are composed of body portions specifically indicated by numeral 14 and radially extending cylindrical portions 15. The inner end of each body portion 14 is drilled to receive a pin 16 which extends through the bifurcation of the member 10 and through the opening in the tooth members 14. It will be obvious from the drawings that the cylindrical portions 15 extend in opposite directions on adjacent tooth members.

The pinion is composed of a central sleeve 17 having flanges 18 integral therewith, and making up therewith a spool. The spool is provided with a suitable keyway 19 for keying the same to a shaft. A plurality of tooth pins 20 are journaled, by means of ball or roller bearings, in the flanges 18 and extend inwardly toward the other flange. The pins in each flange are spaced apart about the distance that would be required to receive another pin therebetween, and the pins on the opposite flange are similarly spaced, but the pins on the two flanges are staggered.

It will be evident from the drawings that the inner ends of the tooth pins 20 are spaced apart a distance sufficient to receive therebetween the body portion 14 of the tooth members on the gear. The tooth pins on the pinion are so spaced and positioned that the projections of all said tooth pins, that is on both flanges, when projected upon a plane perpendicular to the axis of the spool will constitute a complete ring of tangent circles, the centers of all such circles lying on the circumference of a single large circle, the center of which is on the axis of the spool.

I may provide openings in adjacent tooth members, as best seen in Fig. 1, which will register and which may receive a small coil spring 22.

It is evident that the cylindrical portions 15 of the tooth members will have their points of tangency on the pitch circle. While I prefer to have a very small clearance between the teeth for flexibility, ease in assembling, and for taking up slight inaccuracies of the machine, it is evident that these may, if desired, be of such diameters that no clearance whatever is left between them and they may all be in contact entirely around the gear. It will be noted that the body portions of the tooth members separate at a small angle from the point of tangency. If a very small total clearance is provided, when the gear is in operation the tooth members will pivot about the pins 16 a very slight amount, that is, until by their pivoting action the pitch circle has been sufficiently reduced in diameter to take up the clearance and cause all the cylindrical portions to be in contact. When this condition is reached, it is evident that the entire gear will act as if rigid and all the pins 16 will cooperate in taking up the stress of the load. The angles between the body portions from the point of tangency are such that the clearance which is left between the tooth members will be taken up before the pivoting about the pins 16 is enough to place the same in shear. From the foregoing, it will be evident that the total power which each tooth is capable of transmitting is determined by the strength of the cylindrical portion which projects beyond the body portion in the case of the gear, and by the strength of the tooth engaging portion of the pinions.

While I have illustrated the preferred embodiment of my invention, I wish it understood that I am not limited to the details of such illustration but may carry out my invention in various forms within the scope of the appended claims.

Having thus described my invention, what I claim is:—

1. A gearing assembly comprising a gear and a pinion, said gear including a circumferentially grooved disk, tooth members pivoted at one end in the groove of said disk, each of said tooth members having a cylindrical portion extending laterally therefrom, alternate said cylindrical members extending in opposite directions.

2. A gearing assembly comprising a gear and a pinion, said gear including a circumferentially grooved disk, tooth members pivoted at one end in the groove of said disk, each of said tooth members having a cylindrical portion extending laterally therefrom, alternate said cylindrical members extending in opposite directions, said pinion including a spool having flanges, and tooth-pins rotatably mounted in said flanges and extending inwardly, said tooth-pins being staggered in the opposite flanges.

3. A gearing assembly comprising a gear and a pinion, said gear including a circumferentially grooved disk, tooth members pivoted at one end in the groove of said disk, each of said tooth members having a cylindrical portion extending laterally therefrom, alternate said cylindrical members extending in opposite directions, said pinion including a spool having flanges, and tooth-pins rotatably mounted in said flanges and extending inwardly, said tooth-pins being staggered in the opposite flanges, and the ends thereof being spaced from the ends of those on the opposing flange.

4. A gearing assembly comprising a gear and a pinion, said gear including a circumferentially grooved disk, tooth members pivoted at one end in the groove of said disk, each of said tooth members having a cylindrical portion extending laterally therefrom, alternate said cylindrical members extending in opposite directions, said pinion including a spool having flanges, and tooth-pins rotatably mounted in said flanges and extending inwardly, said tooth-pins being staggered in the opposite flanges, the projections of said tooth pins on a plane perpendicular to their axes constituting a complete ring of tangent circles, the centers of all such circles lying on the circumference of a single large circle, the center of which is on the axis of said spool.

5. A gearing assembly comprising a gear and a pinion, said gear including a circumferentially grooved disk, tooth members pivoted at one end in the groove of said disk, each of said tooth members having a cylindrical portion extending laterally therefrom, alternate said cylindrical members extending in opposite directions, said pinion including a spool having flanges, and tooth-pins rotatably mounted in said flanges and extending inwardly, said tooth-pins being staggered in the opposite flanges, and the ends thereof being spaced from the ends of those on the opposing flange, the projections of said tooth pins on a plane perpendicular to their axes constituting a complete ring of tangent circles, the centers of all such circles lying on the circumference of a single large circle, the center of which is on the axis of said spool.

6. A gearing assembly comprising a gear and a pinion, said pinion including a spool having flanges, and tooth-pins rotatably mounted in said flanges and extending inwardly, said tooth-pins being staggered in the opposite flanges.

7. A gearing assembly comprising a gear and a pinion, said pinion including a spool having flanges, and tooth-pins rotatably mounted in said flanges and extending inwardly, said tooth-pins being staggered in the opposite flanges, the projections of said tooth pins on a plane perpendicular to their axes constituting a complete ring of tangent circles, the centers of all such circles lying on the circumference of a single large circle, the center of which is on the axis of said spool.

8. A gearing assembly comprising a gear and a pinion, said gear including a circumferentially grooved disk, tooth members pivoted in the groove of said disk and each comprising a body portion of a thickness to fit snugly into said groove and a cylindrical portion extending laterally therefrom, alternate said cylindrical members extending in opposite directions, said pinion including a spool having flanges, and tooth-pins rotatably mounted in said flanges and extending inwardly, said tooth-pins being staggered in the opposite flanges, and the ends thereof being spaced from the ends of those on the opposing flange a distance greater than the thickness of said body portion.

9. A gearing assembly comprising a gear and a pinion, said gear including a circumferentially grooved disk, tooth members pivoted in the groove of said disk and each comprising a body portion of a thickness to fit snugly into said groove and a cylindrical portion extending laterally therefrom, alternate said cylindrical members extending in opposite directions, said pinion including a spool having flanges, and tooth-pins rotatably mounted in said flanges and extending inwardly, said tooth-pins being staggered in the opposite flanges, and the ends thereof being spaced from the ends of those on the opposing flange a distance greater than the thickness of said body portion, the projections of said tooth pins on a plane perpendicular to their axes constituting a complete ring of tangent circles, the centers of all such circles lying on the circumference of a single large circle, the center of which is on the axis of said spool.

In testimony whereof, I hereunto affix my signature.

ARNOLD RUETSCHI.